(12) United States Patent
Nagahara et al.

(10) Patent No.: US 7,280,285 B2
(45) Date of Patent: Oct. 9, 2007

(54) PROJECTION LENS AND PROJECTION DISPLAY DEVICE USING THE SAME

(75) Inventors: Akiko Nagahara, Koshigaya (JP); Chikara Yamamoto, Kodaira (JP)

(73) Assignee: Fujinon Corporation, Saitama (JP)

( * ) Notice: Subject to any disclaimer, the term of this patent is extended or adjusted under 35 U.S.C. 154(b) by 57 days.

(21) Appl. No.: 11/342,858

(22) Filed: Jan. 31, 2006

(65) Prior Publication Data

US 2006/0176576 A1 Aug. 10, 2006

(30) Foreign Application Priority Data

Feb. 7, 2005 (JP) .............................. 2005-031091

(51) Int. Cl.
*G02B 15/14* (2006.01)

(52) U.S. Cl. ..................... 359/680; 359/651; 359/749

(58) Field of Classification Search ................ 359/716, 359/661, 781–783, 680–682, 649, 689, 686
See application file for complete search history.

(56) References Cited

U.S. PATENT DOCUMENTS 5,442,484 A * 8/1995 Shikawa ..................... 359/651
5,745,297 A * 4/1998 Kaneko et al. ............. 359/651
5,973,848 A * 10/1999 Taguchi et al. ............. 359/651
6,275,343 B1 * 8/2001 Takamoto et al. .......... 359/749

FOREIGN PATENT DOCUMENTS

| JP | 2001-337267 | 12/2001 |
|---|---|---|
| JP | 2002-31754 | 1/2002 |
| JP | 2002-365541 | 12/2002 |
| JP | 2003-156683 | 5/2003 |
| JP | 2003-195164 | 7/2003 |
| JP | 2003-248169 | 9/2003 |
| JP | 3487468 | 10/2003 |

* cited by examiner

*Primary Examiner*—Akm Ullah
*Assistant Examiner*—James R Greece
(74) *Attorney, Agent, or Firm*—Arnold International; Jon W. Henry; Bruce Y. Arnold (57) ABSTRACT

A projection lens includes three lens groups, arranged as follows from the magnification side: a first lens group of negative refractive power, a second lens group of positive refractive power, and a third lens group of positive refractive power. The first lens group includes three lens elements, each of negative refractive power, and two of these lens elements each have a meniscus shape with its convex surface on the magnification side. The second lens group includes a lens element having positive refractive power, a meniscus shape, and a convex surface on the magnification side. The third lens group includes: a lens element of positive refractive power and a meniscus shape with its convex surface on the reduction side; a cemented lens component; and at least one aspheric surface. The projection lens satisfies specified conditions regarding focal lengths and spacings of lens surfaces. A projection display device uses the projection lens.

13 Claims, 7 Drawing Sheets

Spherical Aberration
Fig. 7A

Astigmatism
Fig. 7B

Distortion
Fig. 7C

Lateral Color
Fig. 7D

Spherical Aberration
Fig. 8A

Astigmatism
Fig. 8B

Distortion
Fig. 8C

Lateral Color
Fig. 8D

Spherical Aberration
Fig. 9A

Astigmatism
Fig. 9B

Distortion
Fig. 9C

Lateral Color
Fig. 9D

Spherical Aberration
Fig. 10A

Astigmatism
Fig. 10B

Distortion
Fig. 10C

Lateral Color
Fig. 10D

PROJECTION LENS AND PROJECTION DISPLAY DEVICE USING THE SAME

FIELD OF THE INVENTION

The present invention relates to a projection lens for magnifying and projecting display information on light valves, and in particular, relates to a projection lens suitable for a rear projection display device, such as rear projection televisions and similar display devices.

BACKGROUND OF THE INVENTION

Known projection display devices include front projection display devices in which a projection lens is arranged on the same side as an audience viewing light beams containing information reflected from a reflective display screen, and rear projection display devices in which a transmissive display screen is arranged between an audience and a projection lens that transmits light beams containing information to the transmissive display screen. In rear projection display devices, such as rear projection televisions, it is well known to arrange the transmissive display screen in the front of a cabinet that contains a light source and the projection lens facing the screen.

In such cabinets, a smaller cabinet is preferred. Therefore, there is a demand that the volume of the cabinet be decreased. For this reason, shortening the projection distance, i.e., the distance from the surface of a projection lens toward the projection screen to the projection screen enables making the television thinner but requires widening the projection field angle of the projection lens. These considerations have led to projection lenses with widened projection field angles, as set forth, for example, in Japanese Laid-Open Patent Applications 2001-337267, 2002-031754, 2002-365541, and 2003-195164 and Japanese Patent No.3487468.

Proposals for deflecting the optical path in projection lens systems have also been made for minimizing the height of the cabinet. Deflecting the optical path at an acute angle, as small an angle as possible, is desirable for miniaturizing devices in this way. Japanese Laid-Open Patent Application 2003-156683 discloses a mirror used to deflect the optical path and Japanese Laid-Open Patent Application 2003-248169 discloses a prism used to deflect the optical path.

In a rear projection display device, a correction of distortion among aberrations is often particularly important. Recently, a display method known as multi-display, in which multiple projection optical units are arrayed up and down and left to right in order to display a large picture has been frequently adopted. However, a projection lens for high correction of distortion is particularly required so that the seams of each unit are not strikingly evident in a large picture, which requires distortion to be kept within 0.3%. Generally, the front and rear lens groups on opposite sides of a stop in a wide-angle projection lens are highly asymmetrical, which makes distortion correction particularly difficult.

As a projection lens for projection display devices using liquid crystals, providing telecentric properties with regard to the illumination system is also important in order to prevent the occurrence of color irregularity and loss of light.

As described above, many projection lenses for miniaturizing a cabinet projection display device have been proposed, but simultaneously satisfying all of the various demands described above is very difficult. A projection lens that achieves the desired results with optical path deflection as desired, as well as satisfying demands related to projection field angle, distortion correction, f-number, and other requirements has not yet been realized.

The projection lenses described in Japanese Laid-Open Patent Applications 2001-337267, 2002-031754, 2002-365541, and 2003-195164 and Japanese Patent No. 3487468 do not have the required space for arranging an optical path deflector in order to achieve miniaturization. The projection lens described in Japanese Laid-Open Patent Application 2001-337267 has an insufficient field angle and an insufficient back focus, and also has a large number of lens elements. The projection lens described in Japanese Laid-Open Patent Application 2002-031754 does not provide a small enough f-number. The projection lens described in Japanese Laid-Open Patent Application 2003-195164 has insufficient field angles and does not provide a small enough f-number.

The projection lens described in Japanese Laid-Open Patent Application 2003-156683 is suitable for miniaturization because it provides a wide field angle and the optical path is deflectable at an acute angle in the lens system, but the use of the lens is limited because the back focus is short and distortion is great.

The projection lens described in Japanese Laid-Open Patent Application 2003-248169 is suitable for miniaturization because a prism is arranged to deflect the optical path in the lens system, but this is less favorable than a mirror in terms of weight and cost. According to this construction, a small f-number is not provided. Moreover, the space necessary for the arrangement of a mirror is larger than for a prism. Therefore, a mirror cannot simply replace the prism. Although a mirror provides advantages of less weight and lower cost than a prism, a larger space must be provided, which increases the difficulty of optical design as compared to using a prism.

BRIEF SUMMARY OF THE INVENTION

The present invention relates to a wide-angle projection lens that enables arranging a mirror as the optical path deflector, has a construction suitable for miniaturization, favorably corrects aberrations, especially distortion, has a simple construction, and is lightweight and of low cost. The present invention further relates to a projection display device using such a projection lens.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

First, definitions of the terms "lens element," "lens component," and "lens group," that relate to the following detailed description will be given. The term "lens element" is herein defined as a single transparent mass of refractive material having two opposed refracting surfaces, which surfaces are positioned at least generally transverse to the optical axis of the projection lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing lens elements together.

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Figure 1:
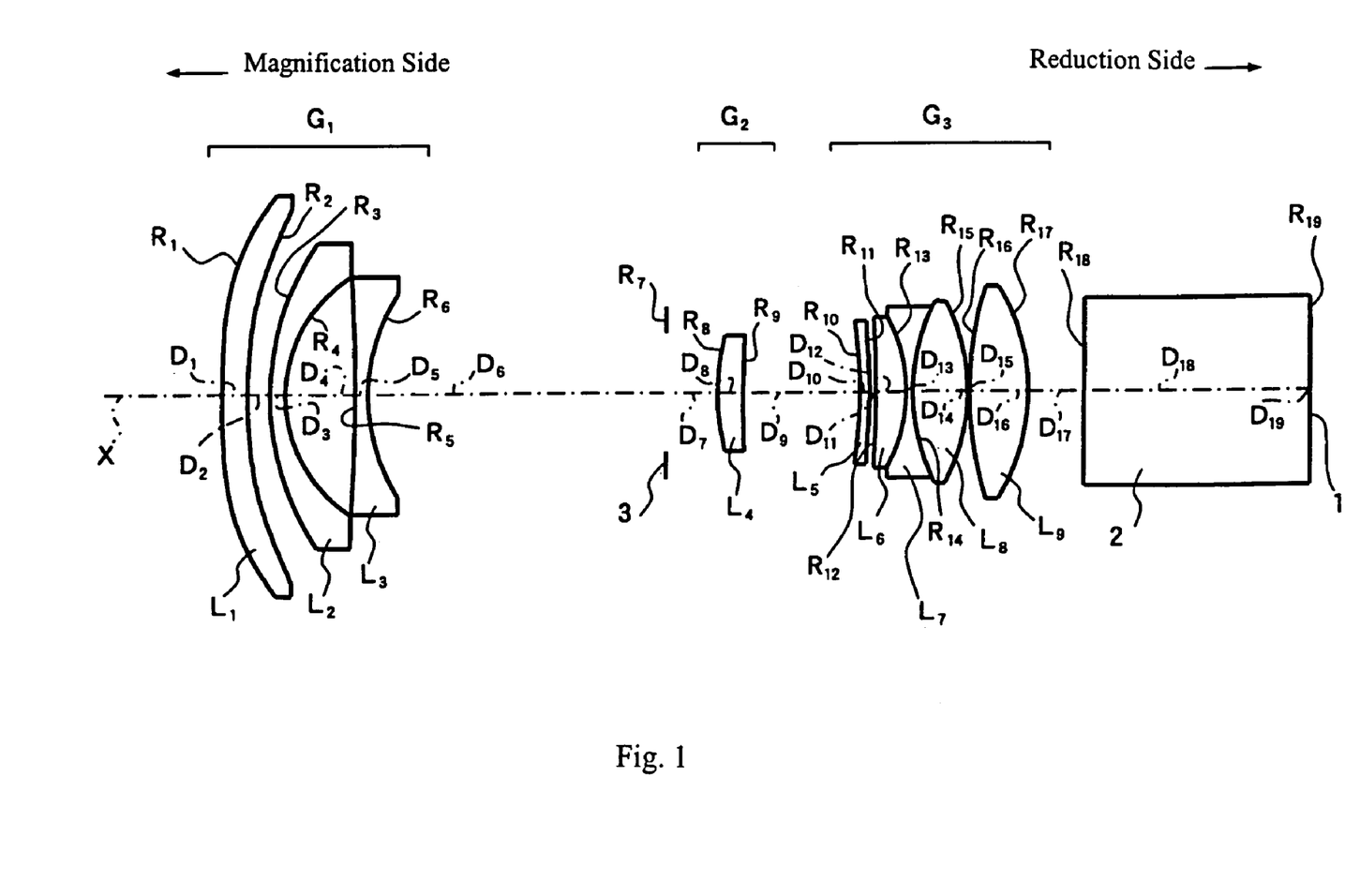
FIG. 1 shows a cross-sectional view of the projection lens of Embodiment 1 of the present invention.

A general description of the projection lens of the present invention that pertains to disclosed embodiments of the invention will now be described with reference to FIG. 1 that shows Embodiment 1. In FIG. 1, a horizontal arrow at the upper left of FIG. 1 that points left indicates the magnification side of the projection lens, and a horizontal arrow at the upper right of FIG. 1 that points right indicates the reduction side of the projection lens. In FIG. 1, lens elements are referenced by the letter L with a subscript denoting their order from the magnification side of the projection lens along the optical axis X, from $L_1$ to $L_9$. Similarly, the radii of curvature of the optical surfaces are referenced by the letter R with a subscript denoting their order from the magnification side of the projection lens, from $R_1$ to $R_{19}$. The on-axis surface spacings along the optical axis X of the various optical surfaces are referenced by the letter D with a subscript denoting their order from the magnification side of the projection lens, from $D_1$ to $D_{19}$. In the same manner, three lens groups are labeled $G_1$, $G_2$, and $G_3$ in order from the magnification side of the projection lens, and the optical components belonging to each lens group are indicated by brackets adjacent the labels $G_1$, $G_2$, and $G_3$.

The projection lens of the present invention includes, arranged in order from the magnification side, a first lens group $G_1$ having negative refractive power, a second lens group $G_2$ having positive refractive power, and a third lens group $G_3$ having positive refractive power. The first lens group $G_1$ includes, arranged in order from the magnification side, a first lens element $L_1$ having negative refractive power, a meniscus shape, a convex surface on the magnification side, and at least one aspheric surface, a second lens element $L_2$ having negative refractive power, a meniscus shape, and a concave surface on the reduction side, and a third lens element $L_3$ having negative refractive power with its surface having the greater absolute value of refractive power being concave and on the reduction side. That is, the absolute value of the radius of curvature of the surface of the third lens element $L_3$ that is on the reduction side is smaller than the radius of curvature of the surface of the third lens element $L_3$ that is on the magnification side.

The second lens group $G_2$ includes a fourth lens element $L_4$ having a convex surface on the magnification side. The third lens group $G_3$ includes: a fifth lens element $L_5$ having positive refractive power and meniscus shape with its convex surface on the reduction side; and at least one lens component formed by cementing at least two lens elements together; and another lens component of positive refractive power. In the projection lens of FIG. 1, the "at least one lens component formed by cementing at least two lens elements together" is formed of a sixth lens element $L_6$, a seventh lens element $L_7$, and an eighth lens element $L_8$ that are cemented together, and the "another lens component of positive refractive power" is formed of a ninth lens element $L_9$ that is biconvex. Additionally, in the third lens group $G_3$, at least the surface on the magnification side of the lens group is an aspheric surface.

Moreover, in the projection lens of FIG. 1, a light beam incident from the right side of FIG. 1 receives image information from a light valve 1, enters into the projection lens via a glass block 2, and is magnified and projected in the direction toward the left side of FIG. 1. In FIG. 1, only one light valve 1 is shown. However, in a projection display device, a light beam from a light source is separated into three primary color light beams by a color separation optical system, three light valves are arranged for the primary color lights in order to enable displaying a full-color picture. These three primary color light beams can be synthesized by arranging a color synthesizing optical system, such as crossed dichroic prisms, at two positions, all of which is represented by glass block 2.

Figure 2:
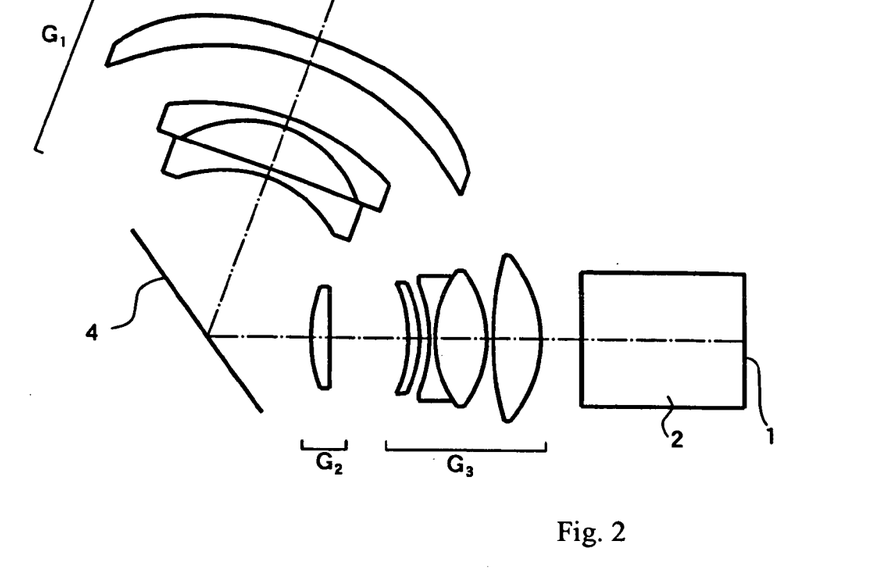
FIG. 2 shows a cross-sectional view of the projection lens of FIG. 1 with a mirror arranged to deflect the optical path.

Furthermore, the projection lens of the present invention has a space for arranging a mirror for deflecting the optical path between the first lens group $G_1$ and the second lens group $G_2$. FIG. 2 shows a cross-sectional view of the projection lens of FIG. 1 with a mirror 4 arranged to deflect the optical path between the first lens group $G_1$ and the second lens group $G_2$. Additionally, the projection lens of the present invention satisfies the following Conditions (1)-(3):

$$|f_1/D_{G1G2}|<0.5 \qquad \text{Condition (1)}$$

$$8<|f_1 \cdot D_{G1G2}|/f^2<13 \qquad \text{Condition (2)}$$

$$0.35<D_{G1G2}/DL<0.55 \qquad \text{Condition (3)}$$

where f₁ is the focal length of the first lens group;

$D_{G1G2}$ is the on-axis distance between the first lens group and the second lens group;

f is the focal length of the projection lens; and

DL is the total length of the projection lens.

By the construction described above, the projection lens of the present invention can be used as a wide-angle projection lens that enables arranging a mirror as an optical path deflector in a system that is suitable for miniaturization, favorably corrects aberrations, especially distortion, has a simple construction, and is lightweight and of low cost. Because the above constituents are set up in connection with each other, these working effects are obtained by satisfying all of the above conditions. Constituents that exert larger influences on the working effects are described below.

First, the construction of a first lens group $G_1$ having negative refractive power, a second lens group $G_2$ having positive refractive power, and a third lens group $G_3$ having positive refractive power enables widening the field angle, which makes it easy to guarantee a back focal length larger than the focal length of the projection lens. The projection distance can be shortened and the projection display device can be made thin by widening the field angle of the projection lens.

The first lens group $G_1$ is constructed only with lens elements having negative refractive power and does not use a lens element having positive refractive power. Therefore, the outside diameter of the lens elements does not increase toward the reduction side, which is favorable for system miniaturization. Even though no lens element having positive refractive power is included in the first lens group $G_1$, distortion can be favorably corrected by including an aspheric surface on the first lens element $L_1$. The first lens group $G_1$ can be made of a simple construction of only three lens elements by the second lens element $L_2$ having negative refractive power and a concave surface on the reduction side, the third lens element $L_3$ having negative refractive power with its surface having the greater absolute value of refractive power being concave and facing the reduction side, and the first lens element $L_1$, which enables a lightweight and low cost projection lens by the projection lens being constructed using a small number of lens elements.

The second lens group $G_2$ can be made of a simple construction having only one lens element by using a lens element with a convex surface on the magnification side, and this further contributes to the projection lens being lightweight and of low cost. The fourth lens element $L_4$ mainly plays a role of favorably correcting spherical aberration.

The third lens group $G_3$ includes a fifth lens element $L_5$ having positive refractive power, a meniscus shape, a convex surface on the reduction side, and an aspheric surface on the magnification side of the third lens group $G_3$. Including this at least one aspheric surface can reduce the burden of correcting monochromatic aberrations in the cemented lens elements in the rear section (i.e., the reduction-side section) of the third lens group $G_3$. This enables good correction of chromatic aberration in these cemented lens elements, which eliminates the need for a lens element having negative refractive power in the second lens group $G_2$ so that the second lens group $G_2$ can be formed of a single lens element having positive refractive power.

In the first lens element $L_1$ and the fifth lens element $L_5$ that each include an aspheric surface, either surface of each lens element may be aspheric, but it is preferable that both of these lens elements have both surfaces be aspheric. The lens surface or surfaces that are aspheric are defined using the following equation:

$$Z=[(Y^2/R)/\{1+(1-K\cdot Y^2/R^2)^{1/2}\}]+\Sigma(A_i\cdot Y^i)$$  Equation (A)

where

Z is the length (in mm) of a line drawn from a point on the aspheric lens surface at a distance Y from the optical axis to the tangential plane of the aspheric surface vertex, R is the radius of curvature (in mm) of the aspheric lens surface on the optical axis, Y is the distance (in mm) from the optical axis, K is the eccentricity, and $A_i$ is the ith aspheric coefficient, and the summation extends over i.

In embodiments of the invention disclosed below, only aspheric coefficients $A_3$-$A_{15}$ are non-zero and sometimes some of these aspheric coefficients are also zero.

The projection display device of the present invention includes a light source, a light valve, an illumination optical part guiding a light beam from the light source to the light valve and a projection lens of the present invention, with the light beam from the light source being modulated by the light valve and projected onto a screen by the projection lens. The projection display device of the present invention can be miniaturized by using the projection lens of the present invention and achieves the same effects as the projection lens of the present invention. Because the projection lens of the present invention is used, the distortion and chromatic aberration are favorably corrected, and, when used in a composite picture display, the joints in the display sections do not stand out and a high quality, large picture display can be obtained.

Figure 3:
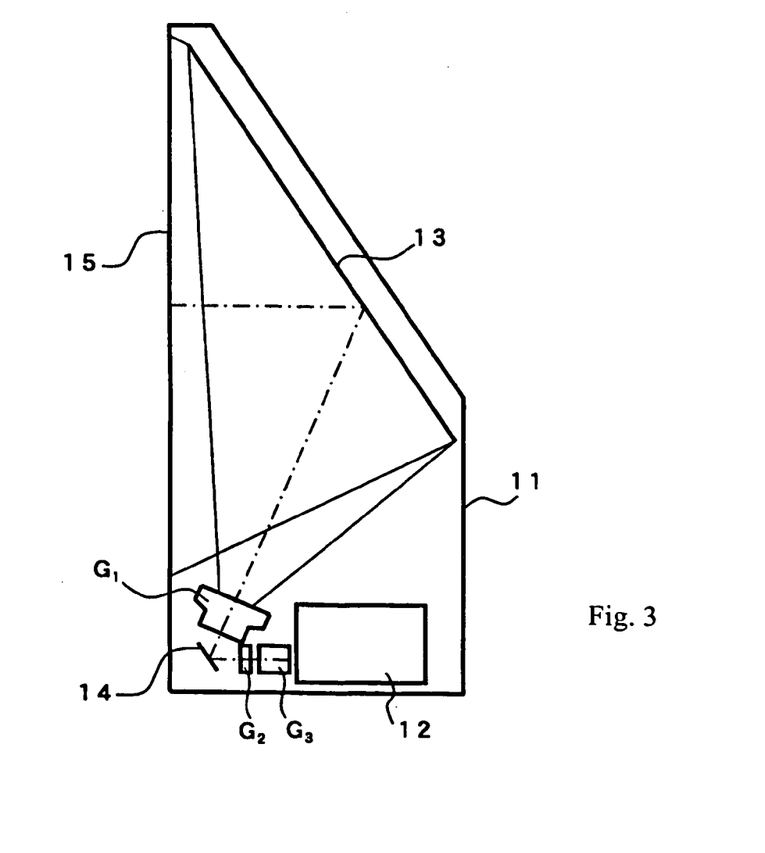
FIG. 3 shows a schematic cross-sectional view of a projection display device in which a projection lens of the present invention may be used.

FIG. 3 shows a schematic cross-sectional view of a projection display device in which a projection lens of the present invention may be used. FIG. 3 shows a rear projection display device as an example particularly suited to showing the arrangement and operation of the projection lens of the present invention. The up and down direction of FIG. 3 may commonly be the vertical direction in use of the projection display device of the present invention.

As shown in FIG. 3, the projection display device is a device in which all optical members, from a light source, which is included in an illumination optical system 12, to a screen 15, are contained in a cabinet 11. The illumination optical system 12 includes a light source, an illumination optical part, a light valve, and, if necessary, a color separation optical system and a color synthesis optical system. An illuminating light beam is modulated by the light valve, and a light beam carrying image information is projected to the rear face of the screen 15 arranged at a prescribed distance from the projection lens that includes lens groups $G_1$-$G_3$ and a mirror 14. The audience views a picture magnified and projected onto the screen 15 from outside the cabinet to the left in FIG. 3.

As shown in FIG. 3, the compaction of the projection display device, especially in the height direction, is enabled by arranging a mirror 14 that is positioned between the first lens group $G_1$ and the second lens group $G_2$ of the projection lens so as to deflect (i.e., fold) the optical path. In order to miniaturize the device, the deflected optical path direction is at an acute angle to the light path direction before being incident onto the mirror 13, and preferably the acute angle is as small an angle as is possible. However, the mirror 14 must be arranged so that the lens elements do not interfere with the path of the light beam and do not interfere with one another.

Conditions (1)-(3) above assure a space $D_{G1G2}$, as defined above, so that the mirror deflecting the optical path can be arranged without causing interference in the optical system and without increasing the total length of the optical system. In the space $D_{G1G2}$ between the first lens group $G_1$ and the second lens group $G_2$ that is used for bending the optical path, if an angle between the optical axis and a light ray passing through this space, an angle known as a "light angle", is large, the diameter of the lens elements must increase so quickly away from this space, even if distances are somewhat extended, that interference as described above cannot be avoided.

Accordingly, Condition (1) is satisfied so that the light angle in the region of optical path deflection by the mirror can be kept small in order to avoid system interference. If Condition (1) is not satisfied, the optical power of the first lens group $G_1$ decreases too much, and in the case of obtaining a wide field angle, the light angle in the region of optical path deflection by the mirror increases or the distance necessary for obtaining the desired deflection is not obtained.

An appropriate relationship between the space $D_{G1G2}$ and the light angle is also achieved by satisfying Condition (2). If the relation deviates from the range of Condition (2), the space $D_{G1G2}$ in the optical path bending interval becomes longer than necessary or it becomes difficult to avoid system interference while maintaining lens performance.

In general, satisfying Conditions (1) and (2) provides an adequate space for arranging a mirror for deflecting the optical path between the first lens group $G_1$ and the second lens group $G_2$ and compactly constructing the system. As shown in FIG. 3, the arrangement of a mirror deflecting the optical path in the position shown is effective for achieving compactness in a rear projection display device.

Condition (3) prescribes a relation of space $D_{G1G2}$ versus the total length DL of the projection lens. If the upper limit of Condition (3) is not satisfied, the space $D_{G1G2}$ becomes longer than necessary. If the lower limit of Condition (3) is not satisfied, the space $D_{G1G2}$ is insufficient for an optical deflector or the total length DL becomes too large, both cases being undesirable.

Thus, the projection lens of the present invention provides a wide-angle projection and enables arranging a mirror as an optical path deflector in an optical system and is suited to miniaturization of a projection lens system and a projection display device by satisfying Conditions (1)-(3) above. The projection lens of the present invention is favorable in achieving compaction of the projection display device, especially in the height direction of the projection display device, because the lens can also be arranged so that the mirror 4 deflects the light beam at an acute angle, as shown in FIG. 2. This is also shown in FIG. 3 with regard to the mirror 14.

It is preferable that the projection lens of the present invention satisfies the following Conditions (4) and (5):

$$Bf/f > 2.6 \qquad \text{Condition (4)}$$

$$\nu_{(+)} - \nu_{(-)} > 35 \qquad \text{Condition (5)}$$

where

Bf is the back focal length of the projection lens;

f is as defined above;

$\nu_{(+)}$ is the Abbe number of the material of a lens element having positive refractive power that forms part of a lens component on the magnification side in the third lens group; and $\nu_{(-)}$ is the Abbe number of the material of a lens element having negative refractive power that forms part of the same lens component on the magnification side in the third lens group.

Condition (4) prescribes the back focal length of the projection lens of the present invention and defines a necessary and sufficient back focus condition for a space for arranging a prism or similar device for color synthesis on the reduction side of the projection lens. If Condition (4) is not satisfied, the insertion of a prism or similar device for color synthesis becomes difficult.

Condition (5) prescribes the Abbe numbers of cemented lens elements of the third lens group $G_3$. If Condition (5) is not satisfied, it becomes difficult to favorably correct the chromatic aberration in the projection lens. As described above, the projection lens of the present invention uses a simple construction that does not require for chromatic aberration correction a lens element having negative refractive power in the second lens group $G_2$. Therefore, correction made by these cemented lens elements is especially important in order to correct for chromatic aberration of the projection lens.

When more than two lens elements are used to form a lens component on the magnification side of the third lens group $G_3$, and the total number of lens elements used to form the lens component is an even number of lens elements having positive refractive power versus those having negative refractive power, it is preferable that pairs of lens elements, of the more than two lens elements, satisfy Condition (5).

It is preferable that the first lens element $L_1$ and the fifth lens element $L_5$ in the projection lens of the present invention be made of plastic.

The first lens element $L_1$ is the largest lens element in the projection lens. The weight and cost of this lens element can be minimized by making it of plastic. However, there is the problem that a plastic lens is generally affected more than glass by temperature changes. Accordingly, it becomes possible to suppress the effect of temperature change in the overall lens system, beginning with focus shift, by making both the fifth lens element $L_5$ having positive refractive power and the first lens element $L_1$ having negative refractive power of plastic so that the optical effects due to temperature changes of these two lens elements tend to balance one another.

The projection lens of the present invention is preferably constructed so that the field angle is eighty-five degrees or greater. In rear projection display devices, such as rear projection televisions, if the field angle is small, the conjugate length must be increased in order to obtain a desired screen size and making the device compact becomes difficult. It is preferable to use a large field angle, as described above, in order to make the device compact.

The projection lens of the present invention is preferably constructed so that the f-number is 2.5 or less in order to project a bright picture.

Figure 4:
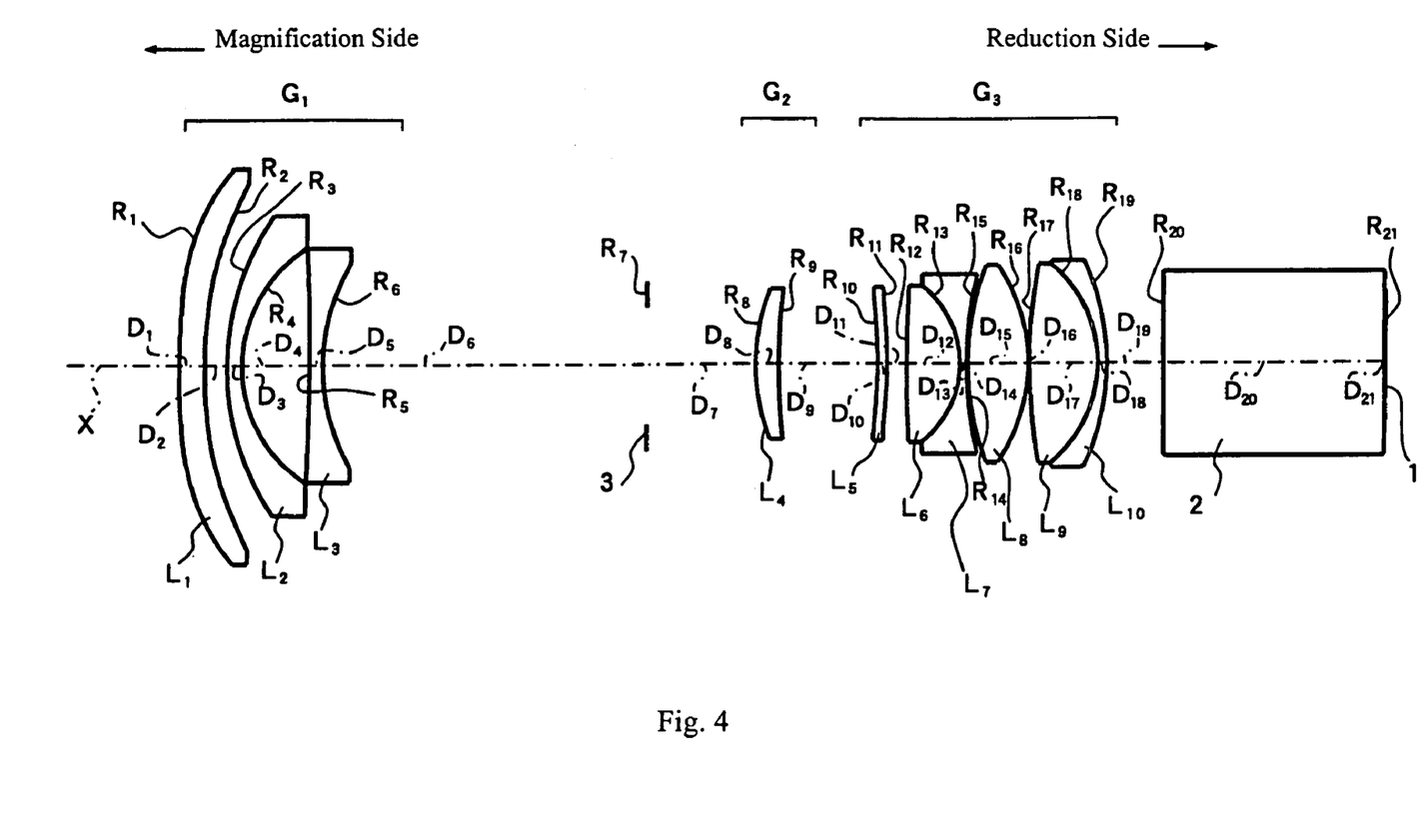
FIG. 4 shows a cross-sectional view of the projection lens of Embodiment 2 of the present invention.
Figure 5:
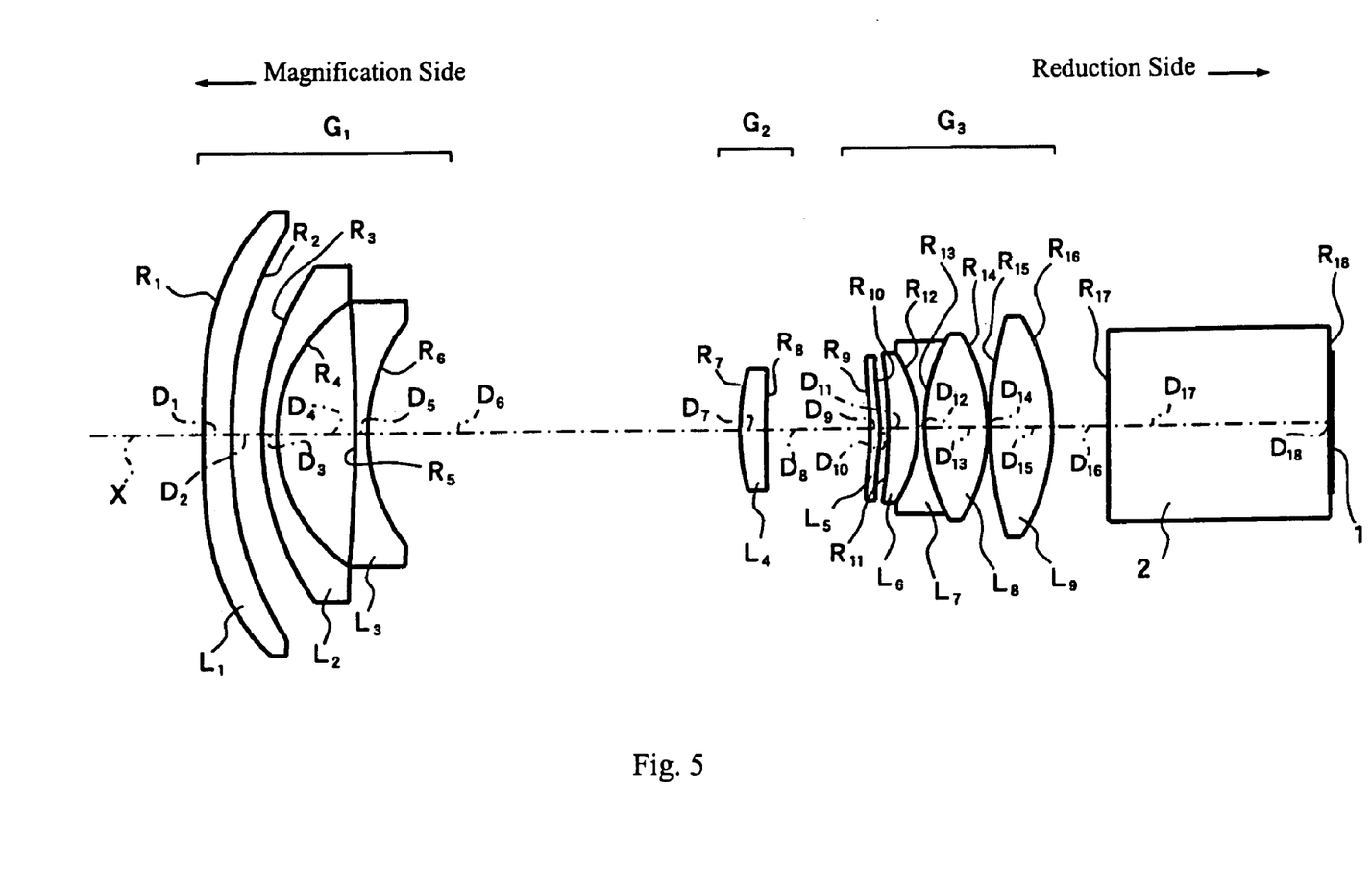
FIG. 5 shows a cross-sectional view of the projection lens of Embodiment 3 of the present invention.
Figure 6:
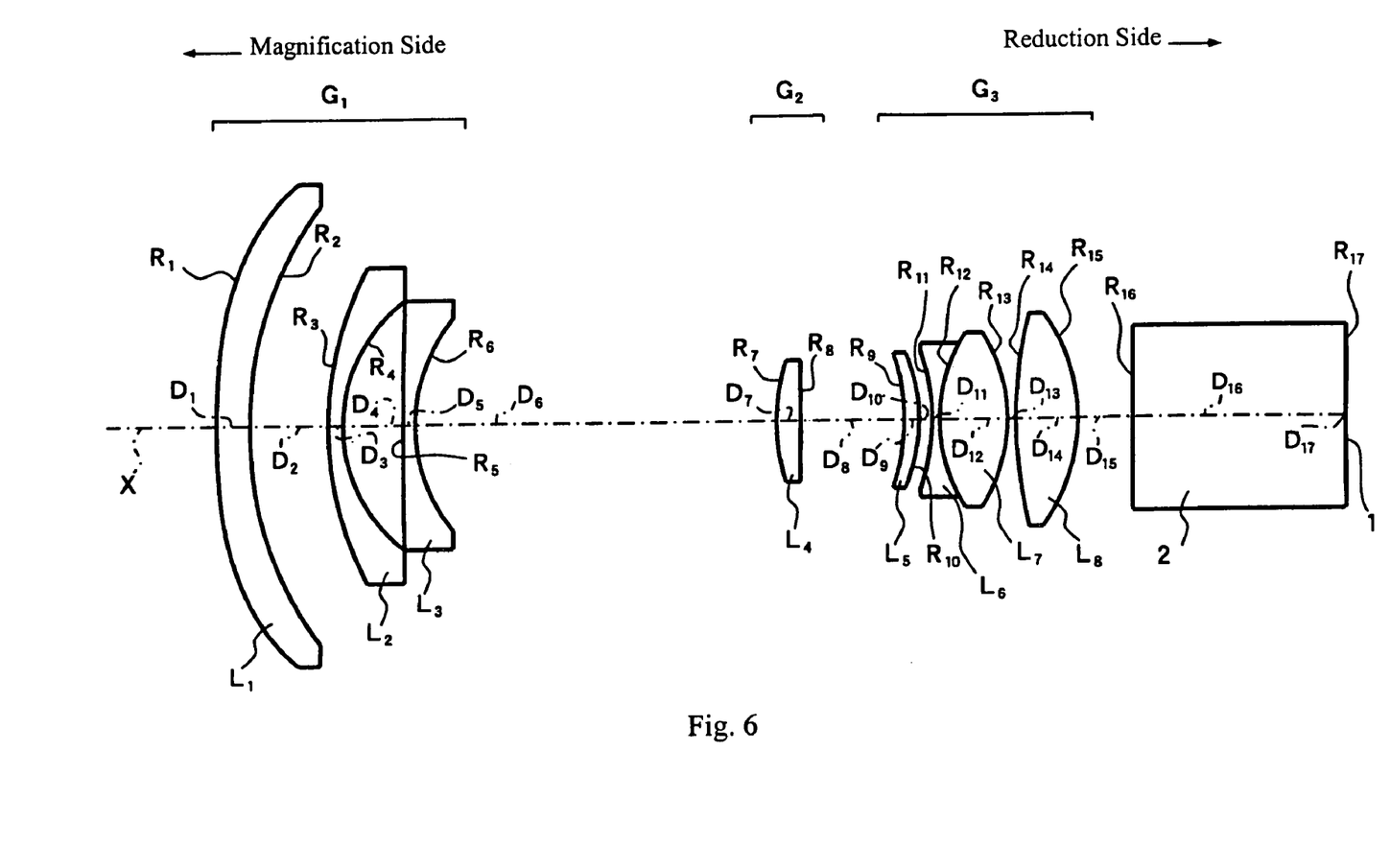
FIG. 6 shows a cross-sectional view of the projection lens of Embodiment 4 of the present invention.

Four embodiments of the present invention will now be individually described with reference to the drawings. In FIGS. 4-6 that show Embodiments 2-4, respectively, the same reference symbols are shown for elements that are the same as in Embodiment 1, shown in FIGS. 1-2, and separate descriptions of these elements are omitted.

EMBODIMENT 1

FIG. 1 shows a cross-sectional view of the projection lens of Embodiment 1 of the present invention. As shown in FIG. 1, the projection lens of Embodiment 1 includes, arranged in order from the magnification side, a first lens group $G_1$ that includes a first lens element $L_1$ having negative refractive power, a meniscus shape, a convex surface on the magnification side, and two aspheric surfaces, a second lens element $L_2$ having negative refractive power, a meniscus shape, and a concave surface on the reduction side, and a third lens element $L_3$ having a biconcave shape and with its surface having the greater absolute value of refractive power on the reduction side.

The second lens group $G_2$ includes a fourth lens element $L_4$ having positive refractive power, a meniscus shape, and a convex surface on the magnification side.

The third lens group $G_3$ includes a fifth lens element $L_5$ of positive refractive power and meniscus shape with its convex surface on the reduction side and with both surfaces aspheric, a lens component formed of three cemented lens elements, namely, a sixth lens element $L_6$ of positive refractive power and a meniscus shape with its convex surface on the reduction side, a seventh lens element $L_7$ having a biconcave shape with surfaces of different curvature and with its surface of greater absolute value of refractive power being on the magnification side, an eighth lens element $L_8$ having a biconvex shape with surfaces of different curvature and with the surface of greater absolute value of refractive power being on the reduction side, and a ninth lens element $L_9$ having a biconvex shape with surfaces of different curvature and with the surface of greater absolute value of refractive power being on the reduction side. With this arrangement, the cemented three-element construction provides high chromatic aberration correction.

A light valve 1, a glass block 2, and an aperture stop 3 are shown in FIG. 1. This projection lens has a space sufficient for a mirror for deflecting the optical path between the first lens group $G_1$ and the second lens group $G_2$, as shown in FIG. 2 with regard to mirror 4. In this case, the aperture stop 3 may also be arranged in the vicinity of the mirror 4. This projection lens is constructed so as to be telecentric on the reduction side; therefore it is also suitable for a construction with glass block 2 operating as a color synthesizer.

Table 1 below lists the surface number # in order from the magnification side, the radius of curvature R of each surface on the optical axis, the on-axis surface spacing D, as well as the refractive index $N_d$ and the Abbe number $\nu_d$ (both at the d-line of 587.6 nm) of each optical element for Embodiment 1. The numerical values of R and D are based on a normalized focal length of 1 for the projection lens of Embodiment 1. Note that, although R is the on-axis radius of curvature, for convenience of illustration in FIG. 1 the lead lines from the R reference symbols extend to the surfaces being referenced but do not extend to the on-axis positions.

TABLE 1

| # | R | D | $N_d$ | $\nu_d$ |
|---|---|---|---|---|
| 1* | 19.385 | 0.362 | 1.49018 | 57.8 |
| 2* | 7.916 | 0.317 | | |
| 3 | 3.608 | 0.208 | 1.80518 | 25.4 |
| 4 | 1.905 | 0.966 | | |
| 5 | −23.462 | 0.176 | 1.51633 | 64.1 |
| 6 | 2.500 | 4.144 | | |
| 7 | (Stop) | 0.679 | | |

TABLE 1-continued

| # | R | D | $N_d$ | $\nu_d$ |
|---|---|---|---|---|
| 8 | 3.061 | 0.360 | 1.84666 | 23.8 |
| 9 | 19.069 | 1.630 | | |
| 10* | −5.337 | 0.136 | 1.49018 | 57.8 |
| 11* | −4.774 | 0.091 | | |
| 12 | −14.121 | 0.411 | 1.51633 | 64.1 |
| 13 | −2.114 | 0.091 | 1.78470 | 26.3 |
| 14 | 2.710 | 0.752 | 1.49700 | 81.6 |
| 15 | −2.652 | 0.018 | | |
| 16 | 4.887 | 0.798 | 1.49700 | 81.6 |
| 17 | −2.798 | 0.780 | | |
| 18 | ∞ | 3.122 | 1.51633 | 64.1 |
| 19 | ∞ | 0.014 | | |

The lens surfaces with a * to the right of the surface number in Table 1 are aspheric lens surfaces, and the aspheric surface shapes of these lens surfaces are expressed by Equation (A) above.

Table 2 below lists the values of the constant K and the aspheric coefficients $A_3$-$A_{10}$ in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 1.0^{-2}$.

TABLE 2

| # | K | $A_3$ | $A_4$ | $A_5$ | $A_6$ |
|---|---|---|---|---|---|
| 1 | 1.8825237 | 0 | 1.9720744E−2 | 0 | −2.3931505E−3 |
| 2 | 1.0431720 | 0 | 1.4720878E−2 | 0 | −2.1211266E−3 |
| 10 | 1.5103471 | 0 | 2.2200056E−2 | 0 | −3.7150194E−3 |
| 11 | 9.5647647 | 0 | 6.7276717E−2 | 0 | 4.6687338E−3 |

| # | $A_7$ | $A_8$ | $A_9$ | $A_{10}$ |
|---|---|---|---|---|
| 1 | 0 | 2.4873650E−4 | 0 | −1.2707376E−5 |
| 2 | 0 | 1.0629315E−4 | 0 | −2.8746961E−6 |
| 10 | 0 | 3.4031675E−4 | 0 | 1.6482618E−5 |
| 11 | 0 | −2.2320421E−4 | 0 | −1.4655263E−5 |

The projection lens of Embodiment 1 satisfies Conditions (1)-(5) above, as set forth in Table 3 below. Values corresponding to Condition (5) are shown in Table 3 for the case of the positive lens element being lens element $L_6$ and for the case of the positive lens element being lens element $L_8$, because two positive lens elements, $L_6$ and $L_8$, are included in the cemented lens of the third lens group $G_3$ in this projection lens.

TABLE 3

| Condition No. | Condition | | Value |
|---|---|---|---|
| (1) | $\|f_1/D_{G1G2}\| < 0.5$ | | 0.407 |
| (2) | $8 < \|f_1 \cdot D_{G1G2}\|/f^2 < 13$ | | 9.476 |
| (3) | $0.35 < D_{G1G2}/DL < 0.55$ | | 0.433 |
| (4) | $Bf/f > 2.6$ | | 2.853 |
| (5) | $\nu_{(+)} - \nu_{(-)} > 35$ | ($L_6$) | 37.8 |
| | | ($L_8$) | 55.3 |

Figure 7A:
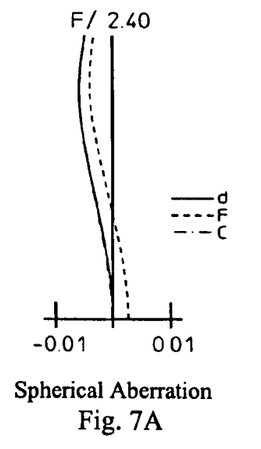
FIGS. 7A-7D show the spherical aberration, astigmatism, distortion, and lateral color, respectively, of the projection lens of Embodiment 1 of the present invention.
Figure 7B:
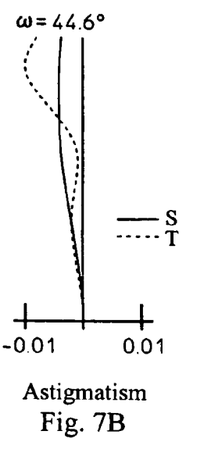
Figure 7C:
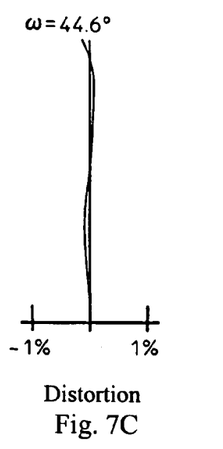
Figure 7D:
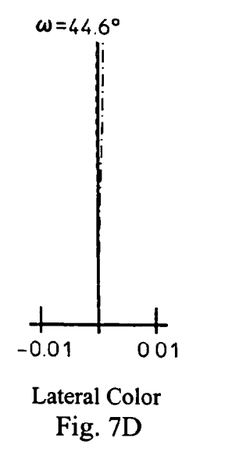

FIGS. 7A-7D show the spherical aberration, the astigmatism, the distortion (in %), and the lateral color, respectively, of the projection lens of Embodiment 1. In FIG. 7A, the spherical aberration is shown for the d-line ($\lambda$=587.6 nm), the F-line ($\lambda$=486.1 nm), and the C-line ($\lambda$=656.3 nm) at a maximum f-number of 2.40. FIGS. 7B-7D show the astigmatism, distortion, and lateral color, respectively, at a half-field angle of 44.6 degrees. In FIG. 7B, the astigmatism is shown for both the sagittal image surface S and the tangential image surface T for the d-line (λ=587.6 nm). In FIG. 7D, the lateral color is shown for the F-line (λ=486.1 nm) and the C-line (λ=656.3 nm) relative to the d-line (λ=587.6 nm).

As is clear from FIGS. 7A-7D, the projection lens of Embodiment 1 provides a wide-angle half-field angle of 44.6 degrees, a bright projection with a maximum f-number of 2.40, and favorably corrects aberrations, including distortion and lateral color.

EMBODIMENT 2

FIG. 4 shows a cross-sectional view of the projection lens of Embodiment 2 of the present invention. The construction of this projection lens is roughly the same as the projection lens of Embodiment 1, but the construction of the third lens group $G_3$ is different.

The third lens group $G_3$ of the projection lens of Embodiment 2 includes, arranged in order from the magnification side: a fifth lens element $L_5$ of positive refractive power and meniscus shape with its convex surface on the reduction side and both surfaces aspheric; a lens component formed by cementing together a sixth lens element $L_6$ of biconvex shape having surfaces of different curvature with its surface of greater absolute value of refractive power being on the reduction side and a seventh lens element $L_7$ of biconcave shape having surfaces of different curvature with the surface of greater absolute value of refractive power being on the magnification side; an eighth lens element $L_8$ of biconvex shape having surfaces of different curvature with the surface of greater absolute value of refractive power being on the reduction side; a lens component formed by cementing together a ninth lens element $L_9$ of biconvex shape having surfaces of different curvature with the surface of greater absolute value of refractive power being on the reduction side and a tenth lens element $L_{10}$ of negative refractive power and meniscus shape with its convex surface on the reduction side.

Thus, in particular, the third lens group $G_3$ includes the features of a fifth lens element $L_5$, a sixth lens element $L_6$ having positive refractive power, a seventh lens element $L_7$ having negative refractive power, an eight lens element $L_8$ that is biconvex, a ninth lens element $L_9$ having positive refractive power, and a tenth lens element $L_{10}$ having negative refractive power, with the sixth and seventh lens elements (namely, $L_6$ and $L_7$) cemented together and the ninth and tenth lens elements (namely $L_9$ and $L_{10}$) cemented together.

In similar but somewhat different terms, in the projection lens of Embodiment 2 of the present invention, the third lens group $G_3$ includes, arranged in order from the magnification side, a fifth lens element $L_5$ having positive refractive power, a meniscus shape, a convex surface on the reduction side, and at least one aspheric surface, a sixth lens element $L_6$ having positive refractive power, a seventh lens element $L_7$ having negative refractive power, an eighth lens element $L_8$ having a biconvex shape, a ninth lens element $L_9$ having positive refractive power, and a tenth lens element $L_{10}$ having negative refractive power, with the sixth and seventh lens elements, $L_6$ and $L_7$, cemented together and the ninth and tenth lens elements, $L_9$ and $L_{10}$, cemented together.

A light valve 1, a glass block 2, and an aperture stop 3 are shown in FIG. 4. The projection lens of Embodiment 2 has a space sufficient for a mirror for deflecting the optical path between the first lens group $G_1$ and the second lens group $G_2$ in the same manner as shown in FIG. 2 with regard to mirror 4. Also, in Embodiment 2, the aperture stop 3 may be arranged in the vicinity of the mirror 4. This projection lens is constructed so as to become telecentric on the reduction side; therefore it is also suitable for a construction with a glass block 2 operating as a color synthesizer.

Table 4 below lists the surface number # in order from the magnification side, the radius of curvature R of each surface on the optical axis, the on-axis surface spacing D, as well as the refractive index $N_d$ and the Abbe number $v_d$ (both at the d-line of 587.6 nm) of each optical element for Embodiment 2. The numerical values of R and D are based on a normalized focal length of 1 for the projection lens of Embodiment 2. Note that although R is the on-axis radius of curvature, for convenience of illustration, in FIG. 4 the lead lines from the R reference symbols extend to the surfaces being referenced but do not extend to the on-axis positions.

TABLE 4

| # | R | D | $N_d$ | $v_d$ |
|---|---|---|---|---|
| 1* | 18.473 | 0.362 | 1.49018 | 57.8 |
| 2* | 7.693 | 0.317 | | |
| 3 | 3.608 | 0.208 | 1.80518 | 25.4 |
| 4 | 1.906 | 0.953 | | |
| 5 | −30.620 | 0.176 | 1.62041 | 60.3 |
| 6 | 2.771 | 4.582 | | |
| 7 | (Stop) | 1.538 | | |
| 8 | 2.699 | 0.330 | 1.84666 | 23.8 |
| 9 | 8.969 | 1.398 | | |
| 10* | −5.324 | 0.136 | 1.49018 | 57.8 |
| 11* | −5.132 | 0.269 | | |
| 12 | 17.337 | 0.750 | 1.48749 | 70.2 |
| 13 | −1.371 | 0.091 | 1.78470 | 26.3 |
| 14 | 5.246 | 0.018 | | |
| 15 | 3.800 | 0.858 | 1.49700 | 81.6 |
| 16 | −2.360 | 0.018 | | |
| 17 | 7.708 | 0.961 | 1.53172 | 48.9 |
| 18 | −1.774 | 0.127 | 1.79952 | 42.2 |
| 19 | −3.335 | 0.780 | | |
| 20 | ∞ | 3.122 | 1.51633 | 64.1 |
| 21 | ∞ | 0.016 | | |

The lens surfaces with a * to the right of the surface number in Table 4 are aspheric lens surfaces, and the aspheric surface shapes of these lens surfaces are expressed by Equation (A) above.

Table 5 below lists the values of the constant K and the aspheric coefficients $A_3$-$A_{10}$ in Equation (A) above for each of the aspheric lens surfaces of Table 4. Aspheric coefficients that are not present in Table 5 are zero. An "E" in the data indicates that the number following the "E" is the exponent to the base 10. For example, "1.0E-2" represents the number $1.0 \times 10^{2-}$.

TABLE 5

| # | K | $A_3$ | $A_4$ | $A_5$ | $A_6$ |
|---|---|---|---|---|---|
| 1 | 1.8719101 | 0 | 1.7569587E−2 | 0 | −2.0151451E−3 |
| 2 | 0.8684362 | 0 | 1.1859375E−2 | 0 | −1.6967751E−3 |
| 10 | 1.2272927 | 0 | 3.4498875E−2 | 0 | 1.8554724E−6 |
| 11 | 13.9353676 | 0 | 5.9088554E−2 | 0 | 3.2331002E−3 |

| # | $A_7$ | $A_8$ | $A_9$ | $A_{10}$ |
|---|---|---|---|---|
| 1 | 0 | 2.0454328E−4 | 0 | −8.9005495E−6 |
| 2 | 0 | 1.1236441E−4 | 0 | −4.1671888E−6 |
| 10 | 0 | 4.3085246E−4 | 0 | 1.7059458E−5 |
| 11 | 0 | −2.9279874E−4 | 0 | −1.5301582E−5 |

The projection lens of Embodiment 2 satisfies Conditions (1)-(5) above, as set forth in Table 6 below.

TABLE 6

| Condition No. | Condition | Value |
|---|---|---|
| (1) | $\|f_1/D_{G1G2}\| < 0.5$ | 0.310 |
| (2) | $8 < \|f_1 \cdot D_{G1G2}\|/f^2 < 13$ | 11.608 |
| (3) | $0.35 < D_{G1G2}/DL < 0.55$ | 0.468 |
| (4) | $Bf/f > 2.6$ | 2.855 |
| (5) | $\nu_{(+)} - \nu_{(-)} > 35$ | 43.9 |

Figure 8A:
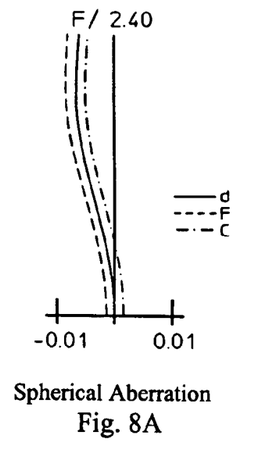
FIGS. 8A-8D show the spherical aberration, astigmatism, distortion, and lateral color, respectively, of the projection lens of Embodiment 2 of the present invention.
Figure 8B:
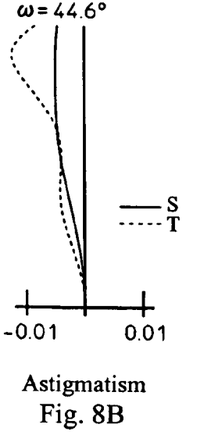
Figure 8C:
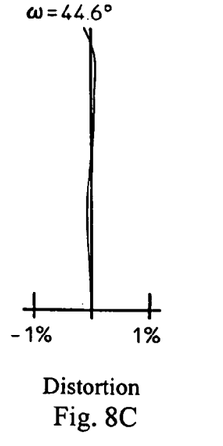
Figure 8D:
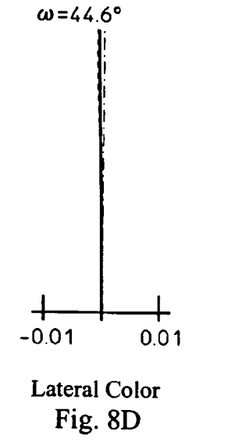

FIGS. 8A-8D show the spherical aberration, the astigmatism, the distortion (in %), and the lateral color, respectively, of the projection lens of Embodiment 2. In FIG. 8A, the spherical aberration is shown for the d-line ($\lambda$=587.6 nm), the F-line ($\lambda$=486.1 nm), and the C-line ($\lambda$=656.3 nm) at a maximum f-number of 2.40. FIGS. 8B-8D show the astigmatism, distortion, and lateral color, respectively, at a half-field angle of 44.6 degrees. In FIG. 8B, the astigmatism is shown for both the sagittal image surface S and the tangential image surface T for the d-line ($\lambda$=587.6 nm). In FIG. 8D, the lateral color is shown for the F-line ($\lambda$=486.1 nm) and the C-line ($\lambda$=656.3 nm) relative to the d-line ($\lambda$=587.6 nm).

As is clear from FIGS. 8A-8D, the projection lens of Embodiment 2 provides a wide-angle half-field angle of 44.6 degrees, a bright projection with a maximum f-number of 2.40, and favorably corrects aberrations, including distortion and lateral color.

EMBODIMENT 3

FIG. 5 shows a cross-sectional view of the projection lens of Embodiment 3 of the present invention. The construction of this projection lens is roughly the same as the projection lens of Embodiment 1 but is different in that the position of the aperture stop is not shown. This projection lens has a space sufficient for a mirror for deflecting the optical path between the first lens group $G_1$ and the second lens group $G_2$ in a manner similar to that shown in FIG. 2 with regard to the mirror 4. This projection lens is constructed so as to be telecentric on the reduction side; therefore it is also suitable for a construction with glass block 2 operating as a color synthesizer.

Table 7 below lists the surface number # in order from the magnification side, the radius of curvature R of each surface on the optical axis, the on-axis surface spacing D, as well as the refractive index $N_d$ and the Abbe number $\nu_d$ (both at the d-line of 587.6 nm) of each optical element for Embodiment 3. The numerical values of R and D are based on a normalized focal length of 1 for the projection lens of Embodiment 3. Note that although R is the on-axis radius of curvature, for convenience of illustration, in FIG. 5 the lead lines from the R reference symbols extend to the surfaces being referenced but do not extend to the on-axis positions.

TABLE 7

| # | R | D | $N_d$ | $\nu_d$ |
|---|---|---|---|---|
| 1* | 59.739 | 0.399 | 1.49018 | 57.8 |
| 2* | 10.725 | 0.431 | | |
| 3 | 3.984 | 0.208 | 1.80518 | 25.4 |
| 4 | 2.153 | 1.099 | | |
| 5 | −20.852 | 0.177 | 1.51633 | 64.1 |
| 6 | 2.449 | 5.250 | | |
| 7 | 3.068 | 0.375 | 1.84666 | 23.8 |
| 8 | 26.959 | 1.468 | | |
| 9* | −3.715 | 0.136 | 1.49018 | 57.8 |
| 10* | −2.975 | 0.114 | | |
| 11 | −7.170 | 0.416 | 1.48749 | 70.2 |
| 12 | −1.908 | 0.091 | 1.78472 | 25.7 |
| 13 | 2.555 | 0.884 | 1.49700 | 81.6 |
| 14 | −2.472 | 0.028 | | |
| 15 | 5.022 | 0.895 | 1.48749 | 70.2 |
| 16 | −2.856 | 0.780 | | |
| 17 | ∞ | 3.126 | 1.51633 | 64.1 |
| 18 | ∞ | 0.046 | | |

The lens surfaces with a * to the right of the surface number in Table 7 are aspheric lens surfaces, and the aspheric surface shapes of these lens surfaces are expressed by Equation (A) above.

Table 8 below lists the values of the constant K and the aspheric coefficients $A_3$-$A_{13}$ in Equation (A) above for each of the aspheric lens surfaces of Table 7. Aspheric coefficients that are not present in Table 8 are zero. An "E" in the data indicates that the number following the "E" is the exponent to the base 10. For example, "1.0E-2" represents the number $1.0 \times 10^{-2}$.

TABLE 8

| # | K | $A_3$ | $A_4$ | $A_5$ | $A_6$ | $A_7$ | $A_8$ |
|---|---|---|---|---|---|---|---|
| 1 | 0.0000000 | 8.2627516E−3 | 1.4797301E−2 | −6.7205397E−4 | −1.5190674E−3 | 4.3216019E−5 | 1.3892431E−4 |
| 2 | 0.7357233 | 9.6314031E−3 | 1.0361301E−2 | 1.7387716E−4 | −1.4989853E−3 | −9.2767552E−5 | 4.0030437E−5 |
| 9 | −2.8106243 | −9.7464729E−3 | 5.4571598E−2 | 1.4915980E−2 | 1.9380746E−2 | 5.4474407E−3 | −1.1446385E−2 |
| 10 | 3.5403242 | −6.0864393E−3 | 9.7297726E−2 | 3.2641049E−2 | 1.6375459E−2 | 2.6614201E−3 | −1.0284428E−3 |

| # | $A_9$ | $A_{10}$ | $A_{11}$ | $A_{12}$ | $A_{13}$ |
|---|---|---|---|---|---|
| 1 | −2.6166104E−6 | −7.6804902E−6 | −2.1968786E−7 | 3.9341488E−7 | 8.9165715E−10 |
| 2 | 7.2498740E−6 | 6.0518944E−6 | 2.0586720E−6 | −9.5364949E−7 | −5.4097317E−9 |
| 9 | −5.2242157E−3 | −2.0057168E−3 | 2.9105509E−3 | −4.4212375E−3 | −1.7520006E−4 |
| 10 | −4.7358120E−3 | −4.7522928E−3 | −5.5801735E−3 | 2.4559171E−3 | −7.3955372E−4 |

The projection lens of Embodiment 3 satisfies Conditions (1)-(5) above, as set forth in Table 9 below. Values corresponding to Condition (5) are shown in Table 9 for the case of the positive lens element being lens element $L_6$ and for the case of the positive lens element being lens element $L_8$, because two positive lens elements, $L_6$ and $L_8$, are included in the cemented lens of the third lens group $G_3$ in this projection lens.

TABLE 9

| Condition No. | Condition | | Value |
|---|---|---|---|
| (1) | $\|f_1/D_{G1G2}\| < 0.5$ | | 0.383 |
| (2) | $8 < \|f_1 \cdot D_{G1G2}\|/f^2 < 13$ | | 10.555 |
| (3) | $0.35 < D_{G1G2}/DL < 0.55$ | | 0.439 |
| (4) | $Bf/f > 2.6$ | | 2.888 |
| (5) | $\nu_{(+)} - \nu_{(-)} > 35$ | $(L_6)$ | 44.5 |
| | | $(L_8)$ | 55.9 |

Figure 9A:
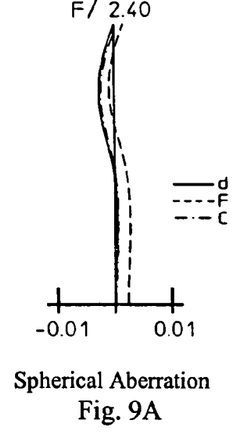
FIGS. 9A-9D show the spherical aberration, astigmatism, distortion, and lateral color, respectively, of the projection lens of Embodiment 3 of the present invention.
Figure 9B:
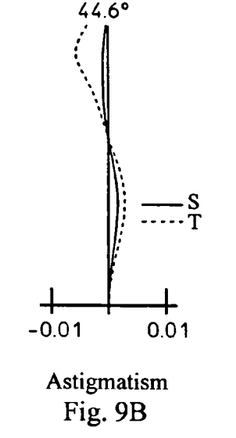
Figure 9C:
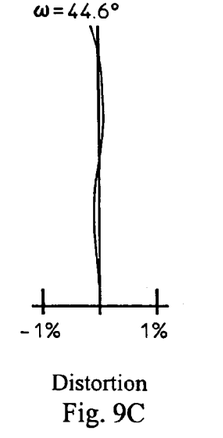
Figure 9D:
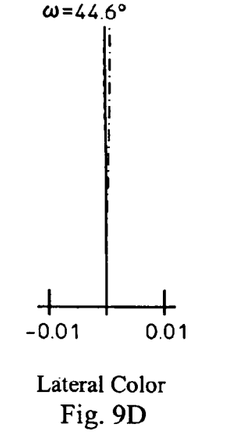

FIGS. 9A-9D show the spherical aberration, the astigmatism, the distortion (in %), and the lateral color, respectively, of the projection lens of Embodiment 3. In FIG. 9A, the spherical aberration is shown for the d-line (λ=587.6 nm), the F-line (λ=486.1 nm), and the C-line (λ=656.3 nm) at a maximum f-number of 2.40. FIGS. 9B-9D show the astigmatism, distortion, and lateral color, respectively, at a half-field angle of 44.6 degrees. In FIG. 9B, the astigmatism is shown for both the sagittal image surface S and the tangential image surface T for the d-line (λ=587.6 nm). In FIG. 9D, the lateral color is shown for the F-line (λ=486.1 nm) and the C-line (λ=656.3 nm) relative to the d-line (λ=587.6 nm).

As is clear from FIGS. 9A-9D, the projection lens of Embodiment 3 provides a wide-angle half-field angle of 44.6 degrees, a bright projection with a maximum f-number of 2.40, and favorably corrects aberrations, including distortion and lateral color.

EMBODIMENT 4

FIG. 6 shows a cross-sectional view of the projection lens of Embodiment 4 of the present invention. The construction of this projection lens is roughly the same as the projection lens of Embodiment 1, but the construction of the third lens element $L_3$ that belongs to the first lens group $G_1$, the fourth lens element $L_4$ that belongs to the second lens group $G_2$, and the third lens group $G_3$ is different. The third lens element $L_3$, of this projection lens has negative refractive power, a meniscus shape, and a convex surface on the magnification side, and the fourth lens element $L_4$ of this projection lens has a biconvex shape.

Additionally, in the projection lens of Embodiment 4 of the present invention, the third lens group $G_3$ includes, arranged in order from the magnification side: a fifth lens element $L_5$ of positive refractive power, a meniscus shape with its convex surface on the reduction side, and both surfaces aspheric; a lens component formed of two cemented lens elements, namely, a sixth lens element $L_6$ having a biconcave shape with surfaces of different curvature and with its surface of greater absolute value of refractive power being on the reduction side and a seventh lens element $L_7$ having a biconvex shape with both surfaces having the same curvature; and an eighth lens element $L_8$ having a biconvex shape with surfaces of different curvature and with its surface of greater absolute value of refractive power being on the reduction side. Thus, the projection lens of this embodiment includes the preferable features of: the fifth lens element $L_5$ being a positive meniscus lens element with its convex surface on the reduction side and having at least one aspheric surface; the sixth and seventh lens elements being cemented to form a lens component, with the sixth lens element $L_6$ being formed of a biconcave lens element having surfaces of different curvature with its surface of greater curvature on the reduction side and with the seventh lens element $L_7$ being biconvex with both surfaces having the same radius of curvature; and an eighth lens element $L_8$ formed of a biconvex lens element having surfaces of different curvature, with the surface of greater curvature on the reduction side. The projection lens of Embodiment 4 is favorable in cost because it uses a smaller number of lens elements than Embodiments 1-3.

Unlike Embodiment 1, the position of the aperture stop is not shown in this embodiment. This projection lens has a space sufficient for a mirror for deflecting the optical path between the first lens group $G_1$ and the second lens group $G_2$ in a manner similar to that shown in FIG. 2 with regard to mirror 4. This projection lens is constructed so as to be telecentric on the reduction side; therefore it is also suitable for a construction with the glass block 2 operating as a color synthesizer.

Table 10 below lists the surface number # in order from the magnification side, the radius of curvature R of each surface on the optical axis, the on-axis surface spacing D, as well as the refractive index $N_d$ and the Abbe number $\nu_d$ (both at the d-line of 587.6 nm) of each optical element for Embodiment 4. The numerical values of R and D are based on a normalized focal length of 1 for the projection lens of Embodiment 4. Note that although R is the on-axis radius of curvature, for convenience of illustration, in FIG. 6 the lead lines from the R reference symbols extend to the surfaces being referenced but do not extend to the on-axis positions.

TABLE 10

| # | R | D | $N_d$ | $\nu_d$ |
|---|---|---|---|---|
| 1* | 15.677 | 0.497 | 1.49018 | 57.8 |
| 2* | 7.135 | 1.144 | | |
| 3 | 4.825 | 0.208 | 1.69895 | 30.1 |
| 4 | 2.233 | 0.868 | | |
| 5 | 63.342 | 0.176 | 1.62041 | 60.3 |
| 6 | 2.370 | 5.286 | | |
| 7 | 2.903 | 0.353 | 1.75520 | 27.5 |
| 8 | −68.185 | 1.509 | | |
| 9* | −3.617 | 0.226 | 1.49018 | 57.8 |
| 10* | −2.287 | 0.189 | | |
| 11 | −2.925 | 0.108 | 1.84666 | 23.8 |
| 12 | 2.279 | 0.992 | 1.49700 | 81.6 |
| 13 | −2.279 | 0.125 | | |
| 14 | 6.101 | 0.908 | 1.48749 | 70.2 |
| 15 | −2.572 | 0.786 | | |
| 16 | ∞ | 3.117 | 1.51633 | 64.1 |
| 17 | ∞ | 0.001 | | |

The lens surfaces with a * to the right of the surface number in Table 10 are aspheric lens surfaces, and the aspheric surface shapes of these lens surfaces are expressed by Equation (A) above.

Table 11 below lists the values of the constant K and the aspheric coefficients $A_3$-$A_{15}$ in Equation (A) above for each of the aspheric lens surfaces of Table 10. Aspheric coefficients that are not present in Table 11 are zero. An "E" in the data indicates that the number following the "E" is the exponent to the base 10. For example, "1.0E-2" represents the number $1.0 \times 10^{-2}$.

TABLE 11

| # | K | $A_3$ | $A_4$ | $A_5$ | $A_6$ | $A_7$ | $A_8$ | $A_9$ |
|---|---|---|---|---|---|---|---|---|
| 1 | 0.0000000 | −9.0419423E−5 | 1.1397839E−2 | 4.0640190E−4 | −1.5198787E−3 | −5.1709416E−6 | 1.3927566E−4 | −8.1905849E−7 |
| 2 | 0.7357233 | −2.1378562E−4 | 1.1571664E−2 | −3.9526630E−4 | −1.4641822E−3 | −3.1661933E−5 | 5.8878240E−5 | 5.2436891E−6 |
| 9 | 6.8038175 | 0 | −2.0197860E−2 | −1.2532348E−2 | −1.4193609E−2 | 2.7501941E−2 | 2.3833678E−3 | −1.0603148E−2 |
| 10 | 2.3218282 | 0 | 3.2133628E−2 | −2.5443119E−2 | 3.7840409E−2 | −1.4849688E−2 | −1.3680328E−2 | 3.4355888E−3 |

| # | $A_{10}$ | $A_{11}$ | $A_{12}$ | $A_{13}$ | $A_{14}$ | $A_{15}$ |
|---|---|---|---|---|---|---|
| 1 | −7.6189450E−6 | −1.0139239E−7 | 3.5583156E−7 | −1.3377602E−8 | −4.2519176E−10 | −6.5061145E−10 |
| 2 | 4.8378534E−6 | 1.9518720E−6 | −1.1211141E−6 | −3.4029961E−9 | −4.0082661E−9 | 5.7769267E−9 |
| 9 | −8.1015813E−3 | 9.3074058E−3 | 1.2743555E−2 | 2.5720115E−2 | −2.3902090E−3 | −2.7362550E−2 |
| 10 | 1.2682262E−2 | 7.6252705E−3 | 7.6917208E−3 | 4.4646170E−3 | −6.2282855E−3 | −9.4996916E−3 |

The projection lens of Embodiment 4 satisfies Conditions (1)-(5) above, as set forth in Table 12 below.

TABLE 12

| Condition No. | Condition | Value |
|---|---|---|
| (1) | $\vert f_1/D_{G1G2} \vert < 0.5$ | 0.369 |
| (2) | $8 < \vert f_1 \cdot D_{G1G2} \vert /f^2 < 13$ | 10.306 |
| (3) | $0.35 < D_{G1G2}/DL < 0.55$ | 0.420 |
| (4) | $Bf/f > 2.6$ | 2.843 |
| (5) | $\nu_{(+)} - \nu_{(-)} > 35$ | 57.8 |

Figure 10A:
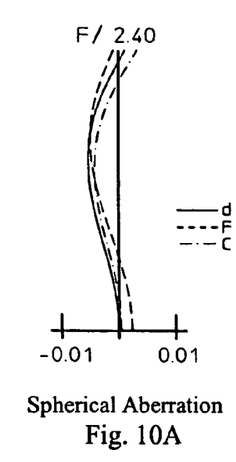
FIGS. 10A-10D show the spherical aberration, astigmatism, distortion, and lateral color, respectively, of the projection lens of Embodiment 4 of the present invention.
Figure 10B:
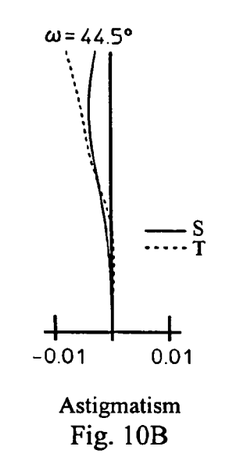
Figure 10C:
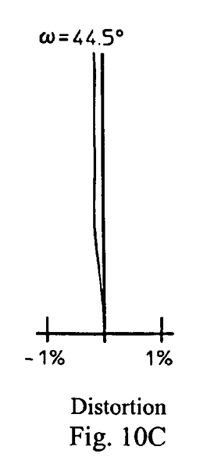
Figure 10D:
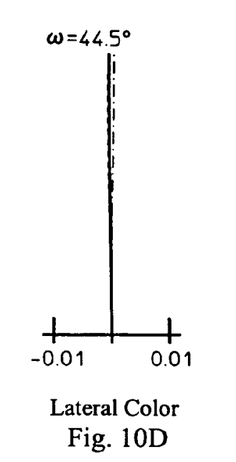

FIGS. 10A-10D show the spherical aberration, the astigmatism, the distortion (in %) and the lateral color, respectively, of the projection lens of Embodiment 4. In FIG. 10A, the spherical aberration is shown for the d-line (λ=587.6 nm), the F-line (λ=486.1 nm), and the C-line (λ=656.3 nm) at a maximum f-number of 2.40. FIGS. 10B-10D show the astigmatism, distortion, and lateral color, respectively, at a half-field angle of 44.5 degrees. In FIG. 10B, the astigmatism is shown for both the sagittal image surface S and the tangential image surface T for the d-line (λ=587.6 nm). In FIG. 10D, the lateral color is shown for the F-line (λ=486.1 nm) and the C-line (λ=656.3 nm ) relative to the d-line (λ=587.6 nm).

As is clear from FIGS. 10A-10D, the projection lens of Embodiment 4 provides a wide-angle half-field angle of 44.5 degrees, a bright projection with a maximum f-number of 2.40, and favorably corrects aberrations, including distortion and lateral color.

The projection lens of the present invention being thus described, it will be obvious that the same may be varied in many ways. For instance, values such as the radius of curvature R of each of the lens elements, the surface spacing D, the refractive index $N_d$, as well as the Abbe number $\nu_d$, are not limited to the examples indicated in each of the aforementioned embodiments, as other values can be adopted.

Additionally, the projection display device of the present invention is not limited to the projection lenses of the embodiments described above nor to the other features of the projection display devices described above, as many variations fall within the scope of the present invention. For example, as light valves, transmissive or reflective liquid crystal display elements may be used, or very small mirrors that are able to change their inclination about a roughly flat surface, such as digital micromirror arrays, may be used. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A projection lens having a magnification side and a reduction side opposite the magnification side and comprising three lens groups, arranged in order from the magnification side, as follows:
   a first lens group having negative refractive power;
   a second lens group having positive refractive power; and
   a third lens group having positive refractive power;
 wherein
   said first lens group includes, arranged in order from the magnification side, a first lens element of negative refractive power and meniscus shape with its convex surface on the magnification side and with at least one surface aspheric, a second lens element of negative refractive power and meniscus shape with its concave surface on the reduction side, and a third lens element of negative refractive power, having surfaces of different curvature, with its surface of greater absolute value of refractive power being concave and on the reduction side;
   said second lens group includes a fourth lens element having positive refractive power, a meniscus shape, and a convex surface on the magnification side;
   said third lens group includes a fifth lens element having positive refractive power, a meniscus shape, a convex surface on the reduction side, and an aspheric surface on the magnification side, and a lens component formed by cementing two or more lens elements together;
   the on-axis distance between said first lens group and said second lens group provides a space for placement of a mirror for deflecting the optical path between said first lens group and said second lens group;
   the projection lens is telecentric on the reduction side; and
   the following conditions are satisfied:

$\vert f_1/D_{G1G2} \vert < 0.5$ $8 < \vert f_1 \cdot D_{G1G2} \vert /f^2 < 13$ $0.35 < D_{G1G2}/DL < 0.55$ where
   $f_1$ is the focal length of said first lens group;
   $D_{G1G2}$ is the on-axis distance between said first lens group and said second lens group;
   f is the focal length of the projection lens; and
   DL is the total length of the projection lens.

2. The projection lens of claim 1, wherein:
   said third lens group includes, arranged in order from the magnification side, said fifth lens element, a sixth lens element having positive refractive power, a seventh lens element having negative refractive power, an eighth lens element having positive refractive power, and a ninth lens element having positive refractive power; and said sixth lens element, said seventh lens element, and said eighth lens element are cemented together to form said lens component.

3. The projection lens of claim 1, wherein:

said third lens group includes, arranged in order from the magnification side, said fifth lens element, a sixth lens element having positive refractive power, a seventh lens element having negative refractive power, an eighth lens element having a biconvex shape, a ninth lens element having positive refractive power, and a tenth lens element having negative refractive power;

said sixth lens element and said seventh lens element are cemented together to form said lens component; and said ninth lens element and said tenth lens element are cemented together to form a lens component.

4. The projection lens of claim 1, wherein:

said third lens group includes, arranged in order from the magnification side, said fifth lens element, a sixth lens element having negative refractive power, a seventh lens element having positive refractive power, an eighth lens element having a biconvex shape; and said sixth lens element and said seventh lens element are cemented together to form said lens component.

5. The projection lens of claim 1, wherein the following conditions are satisfied:

$$Bf/f > 2.6$$

$$\nu_{(+)} - \nu_{(-)} > 35$$

where

Bf is the back focal length of the projection lens;

$\nu_{(+)}$ is the Abbe number of the material of a lens element having positive refractive power that forms part of said lens component on the magnification side; and $\nu_{(-)}$ is the Abbe number of the material of a lens element having negative refractive power that forms part of said lens component on the magnification side.

6. The projection lens of claim 1, wherein said first lens element and said fifth lens element are made of plastic.

7. The projection lens of claim 5, wherein said first lens element and said fifth lens element are made of plastic.

8. The projection lens of claim 1, wherein the field angle is eighty-five degrees or greater.

9. The projection lens of claim 7, wherein the field angle is eighty-five degrees or greater.

10. The projection lens of claim 1, wherein the f-number is 2.5 or less.

11. The projection lens of claim 9, wherein the f-number is 2.5 or less.

12. A projection display device including the projection lens of claim 1 and a light source providing a light beam that is guided by an illumination optical part through a light valve that modulates the light beam before the light beam passes through the projection lens and is projected onto a screen.

13. A projection display device including the projection lens of claim 11 and a light source providing a light beam that is guided by an illumination optical part through a light valve that modulates the light beam before the light beam passes through the projection lens and is projected onto a screen.

* * * * *

UNITED STATES PATENT AND TRADEMARK OFFICE
CERTIFICATE OF CORRECTION

PATENT NO. : 7,280,285 B2
APPLICATION NO. : 11/342858
DATED : October 9, 2007
INVENTOR(S) : Nagahara et al.

It is certified that error appears in the above-identified patent and that said Letters Patent is hereby corrected as shown below:

Column 18
At line 58, change the last condition of claim 1 to:
-- $0.35 < D_{G1G2}/DL < 0.55$ --.

Signed and Sealed this

Fourth Day of March, 2008

JON W. DUDAS
*Director of the United States Patent and Trademark Office*